(12) United States Patent
Alevy

(10) Patent No.: US 10,849,317 B2
(45) Date of Patent: Dec. 1, 2020

(54) ULTRASONIC ERADICATION OF SEA LICE ON FARMED FISH

(71) Applicant: Steven Alevy, New York, NY (US)

(72) Inventor: Steven Alevy, New York, NY (US)

( * ) Notice: Subject to any disclaimer, the term of this patent is extended or adjusted under 35 U.S.C. 154(b) by 414 days.

(21) Appl. No.: 15/263,355

(22) Filed: Sep. 12, 2016

(65) Prior Publication Data

US 2017/0094950 A1 Apr. 6, 2017

Related U.S. Application Data

(60) Provisional application No. 62/217,285, filed on Sep. 11, 2015.

(51) Int. Cl.
| | | |
|---|---|---|
| *A01K 61/13* | (2017.01) | |
| *A01K 61/60* | (2017.01) | |
| *A01K 79/02* | (2006.01) | |
| *A01K 61/80* | (2017.01) | |
| *A01K 13/00* | (2006.01) | |
| *A01K 63/00* | (2017.01) | |

(52) U.S. Cl.
CPC ............ *A01K 61/13* (2017.01); *A01K 13/003* (2013.01); *A01K 61/60* (2017.01); *A01K 61/80* (2017.01); *A01K 63/00* (2013.01); *A01K 79/02* (2013.01); *Y02A 40/814* (2018.01); *Y02A 40/826* (2018.01); *Y02A 40/845* (2018.01)

(58) Field of Classification Search
CPC ...... A01K 61/13; A01K 13/003; A01K 63/04; A01K 63/045
See application file for complete search history.

(56) References Cited

U.S. PATENT DOCUMENTS

| | | | | |
|---|---|---|---|---|
| 6,382,134 | B1 * | 5/2002 | Gruenberg | A01K 63/04 119/215 |
| 8,936,553 | B2 * | 1/2015 | Stigall | A61B 6/504 600/439 |
| 9,107,399 | B2 * | 8/2015 | Takanashi | A01M 29/22 |
| 9,557,200 | B2 * | 1/2017 | Forster | G01F 1/662 |

(Continued)

FOREIGN PATENT DOCUMENTS

| | | | | |
|---|---|---|---|---|
| CA | 2858878 | * | 2/2015 | A01K 61/00 |
| CA | 2858878 A1 | * | 2/2015 | A01K 61/13 |
| JP | WO2013051725 | * | 4/2013 | A01K 61/13 |

OTHER PUBLICATIONS

Tatsushi translation, retrieved from EPO Oct. 21, 2018.*

*Primary Examiner* — Kristen C Hayes

(74) *Attorney, Agent, or Firm* — Israel Nissenbaum; Yitzy Nissenbaum

(57) ABSTRACT

A method, and device for removing sea lice from salmon with use of a salmon herding passage tube, with ultrasound transducers on the periphery thereof, in a number sufficient to provide ultrasound treatment of the salmon being herded therethrough at a normal herding rate and at a sufficiently high enough frequency to kill the sea lice. Salmon are herded therethrough, with the application of ultrasound from the ultrasonic. The method and device also include removal of the lice from a salmon cage or enclosure with feeding fish into an enclosure having ultrasound transducers situated on the inner periphery thereof and providing an attraction such as a white light which attracts noxious parasitic aquatic organisms and applying ultrasound from the electronic transducers within the enclosure.

11 Claims, 1 Drawing Sheet

(56) References Cited

U.S. PATENT DOCUMENTS

| | | | |
|---|---|---|---|
| 2012/0167826 A1* | 7/2012 | Takanashi | A01M 29/22 |
| | | | 119/6.5 |
| 2018/0070556 A1* | 3/2018 | Hagen | A01M 19/00 |
| 2018/0220617 A1* | 8/2018 | Avila | A01K 1/0082 |
| 2018/0255749 A1* | 9/2018 | Wiesman | A01K 61/13 |

* cited by examiner

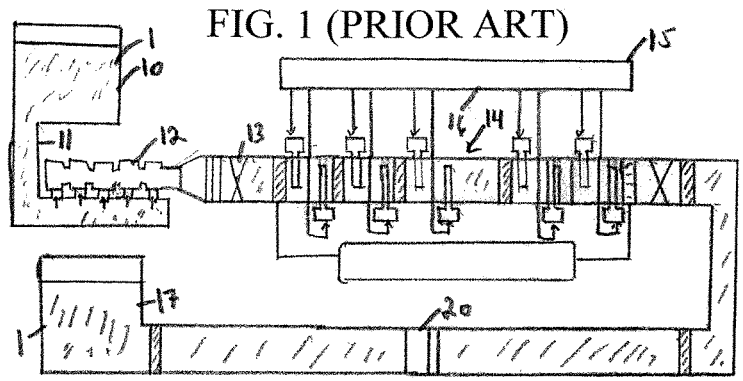
FIG. 1 (PRIOR ART)
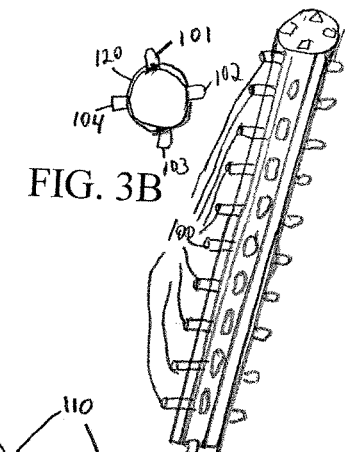
FIG. 3A
FIG. 3B
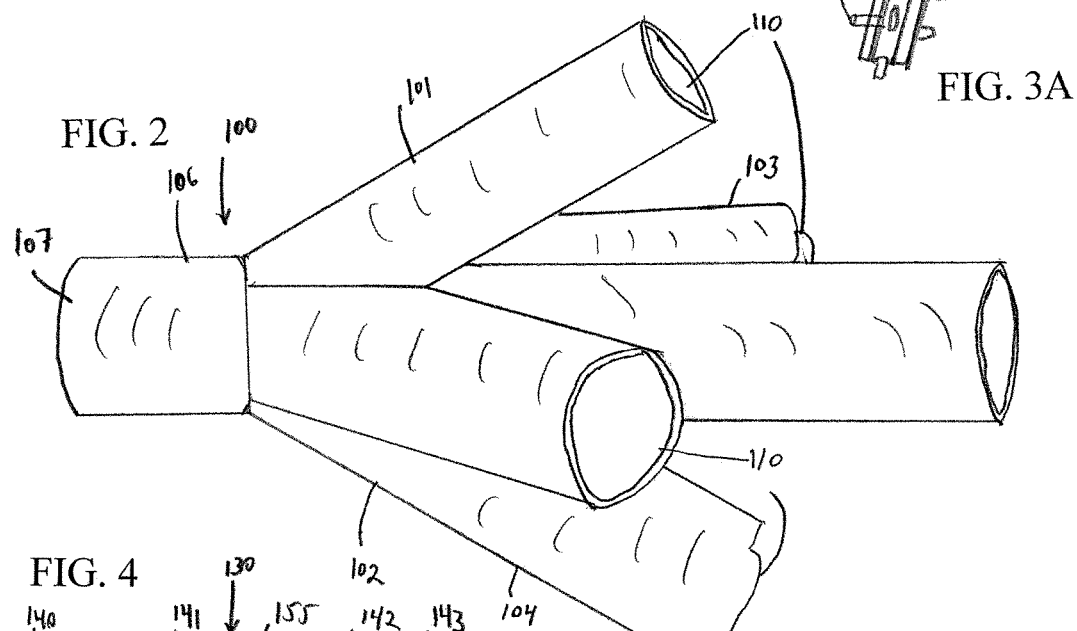
FIG. 2
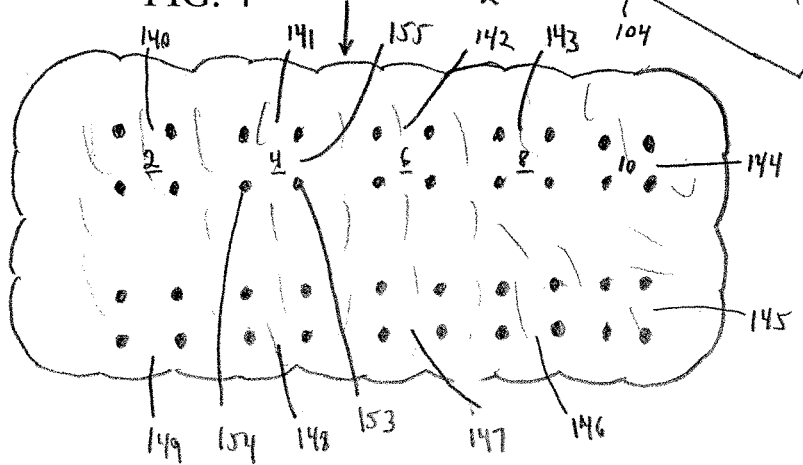
FIG. 4

ULTRASONIC ERADICATION OF SEA LICE ON FARMED FISH

FIELD OF THE INVENTION

This invention relates to ultrasonic treatment for fish and particularly salmon farm applications which is equally effective on sea lice at each life stage of the sea lice—for sea lice attached to the salmon as well as free swimming sea lice in the salmon pen. The invention particularly relates to sound wave and the ultrasound equipment to produce needed sound wave (common adjustable variables primarily include ultrasound frequency, intensity, beam dimension, and duration) as well as the design for a treatment device (such as size, shape, efficiency, to be effective for either continuous flowing, stagnant water sources) to produce the most efficient and effective combination of variables to effectively kill sea lice and not harm fish.

BACKGROUND

The culture of salmons, all salmon species and salmon trout, is a successful example of intensive aquaculture in the world, achieved via innovative research, technological advancement and creative design. Among them, Atlantic salmon is by far the most important and common species (in the North Atlantic, from New England to Ungava Bay in Canada in the west, Iceland, Greenland and from northern Portugal to the Kara Sea off Russia on the east). Atlantic salmon is easy to adapt into and grow well in the culture conditions and with a relatively high commercial value.

Sea lice (Family Caligidae) are small marine copepods that live and feed on salmons and other fish. Sea lice are ectoparasites, attaching to outside of fish on skin, fins, or gills. They consume mucous, blood and skin of salmon. While a few lice on a large salmon may not cause serious damage, they can be really harmful or even fatal to a juvenile. As few as five lice may seriously harm a juvenile Atlantic salmon and may weaken adults to be more prone to infections and parasites, because the feeding activity of sea lice can cause serious fin damage, skin loss, constant bleeding, and deep open wounds. Open wounds allow diseases and other parasites to enter the fishes' bodies. Sea lice can parasitize both farmed and wild salmon, and are a major concern for both the farming industry and for salmon conservation efforts.

Currently, salmon farmers use chemicals and drugs (emamectin benzoate, dichlorvos, pyrethrum, hydrogen peroxide, azamethiphos, cypermethrin, etc) to treat salmon after an outbreak of sea lice occurs. Most drugs were given orally, for example, 50 μg/kg body weight/day of emamectin benzoate for 7 consecutive days). The cost of treatment can be costly and such treatment often involves potential environmental impacts. Human health concerns of using chemicals remain uncertain. Additionally, some management measures can be used to prevent a sea lice outbreak such as proper site location, separating year classes, minimizing crowding, etc. There is however, no cost-effective, non-chemical treatment method available in today's market.

In a related but different situation, thousands of ships travel around the world daily and can carry thousands of gallons of ballast water in order to maintain stability during their voyage. Sea water along with marine creatures can be ballasted from a coastal port and be transported to the next destination of call where the water may be de-ballasted along with the organisms it carries. For example, zebra mussel is one of the many notorious invasive species introduced into North America via discharge of ship ballast water. Zebra mussel invasion has caused detrimental ecological and economic impacts including the endangerment of native North American bivalves. The Convention for the Control and Management of Ship's Ballast Water and Sediments accordingly regulates discharges of ballast water and requires ships to treat ballast water.

In order to effectively treat ballast water, as required, a disinfection organism treatment device has been developed and is being utilized to eliminate noxious aquatic organisms in ship ballast water with use of ultrasound technology. This technology operates by the effect that when directly encountered by aquatic organisms, ultrasound can form cavitation bubbles that damage/kill targeted organisms. The sound energy however dissipates naturally as it travels through the water without causing secondary environmental impacts.

SUMMARY OF THE INVENTION

It is accordingly an object of the present invention, that instead of using ultrasound to treat ship ballast water and to kill all aquatic organisms (with a total disinfection and removal of aquatic organisms from ballast water), to selectively utilize ultrasound in an effective direct aquatic treatment for farmed fish and particularly salmon. The selective treatment controls by killing parasitic organisms such a sea lice on such fish, without possible harmful side effects of chemical treatment and is without detrimental effect on the aquatic organism of the fish themselves.

Generally, the present invention, in an embodiment herein, comprises a method and device for using ultrasound on fish and most commonly farmed fish in a relatively confined area or a specified area through which the fish are essentially herded for the killing of noxious parasitic aquatic organisms having gas pockets therein. The treatment area is controlled for effectiveness relative to the intensity of the ultrasound waves being used and with minimization of effect on the fish themselves. Ultrasound is a sound wave whose frequency is above the audible frequency range for ≥20,000 Hz frequency. Ultrasound sound waves have been found to effectively kill copepods in only seconds, without impacting fish, by means of acoustic cavitation of the gas pockets in the aquatic organisms and particularly microorganism. In addition, the use of ultrasonic technology has been demonstrated as a cost-effective treatment technology for sea lice prevention and treatment.

Generally, the method, in a first embodiment herein, comprises the steps of:

a) providing a fish herding passage element such as a tube, (such as the commonly used twenty foot by one foot diameter tube used for collection of salmon for processing or into salmon cages), with ultrasound transducers on the periphery thereof, in a number of transducers sufficient to provide ultrasound treatment of the fish being herded therethrough at a normal herding rate and at a sufficiently high enough frequency to kill the noxious parasitic aquatic organisms such as sea lice; and b) herding fish therethrough, with the application of ultrasound from the ultrasonic transducers at the sufficiently high frequency and at a herding rate sufficient to enable each fish to be exposed to the ultrasound, for the acoustic cavitation and killing of any noxious parasitic organisms thereon.

In a further embodiment of the present invention the method comprises the steps of:

a) feeding fish into an enclosure having ultrasound transducers situated on the inner periphery thereof;
b) providing an attraction such as a white light which attracts noxious parasitic aquatic organisms thereto within the enclosure; and
c) applying ultrasound from the electronic transducers within the enclosure at a sufficiently high enough frequency and application time for the acoustic cavitation and killing of noxious aquatic organisms within the enclosure.

The present invention further comprises the herding elements with ultrasound transducers and the fish enclosures with inner peripherally positioned ultrasound transducers for use in the above described methods.

It is understood that the above object and other features and advantages of the present invention will become more evident from the following disclosure and description as well as the drawings in which:

SHORT DESCRIPTION OF THE DRAWINGS

FIG. 1 is a depiction of a prior art ultrasound device as used for the disinfection and purification of ship ballast waters.

FIG. 2 is a depiction of a fish herding pipe with multiple outlets each having a centrally located ultrasound transducer.

FIGS. 3a and 3b are isometric and end views respectively of a single herding pipe with peripherally placed ultrasound transducers; and FIG. 4 is upper view of a series of ten fish cages with inner peripherally situated ultrasound transducers.

DETAILED DESCRIPTION OF THE INVENTION AND DRAWINGS

Mechanisms of bioeffects of ultrasound include "thermal" and "mechanical effects". When ultrasound waves are absorbed by plants, energy associated with ultrasound waves is converted into heat, known as thermal effect. An ultrasound wave as it passes through an aqueous medium, may cause bubble activities known as acoustic cavitation. Cavitation causes a wide variety of changes in plant cells, ranging from microstreaming of a cell's internal structure, to a mass disruption of the cell wall. Acoustic cavitation, the dominant mechanism in many applications, is especially evident on aquatic organisms due to the presence of gas inside of aquatic organisms. The gas pockets typically are microscopic in size. Those gas pockets have a high potential to absorb acoustic energy very effectively.

Ultrasound is particularly effective in eliminating microscopic parasitic aquatic organisms, including copepods. Mortality rates are greater than 99.999%. Under exposure of ultrasound, the ultrasonic energy causes bubbling effects or acoustic cavitation inside of copepods. Cavitation damages the internal structure of copepods and causes death of the organisms. Ultrasound also is very effective in disinfection or killing microorganisms. The continuous flow ultrasonic treatments on microbes in milk and apple cider found up to 99.999% reduction in *Listeria monocytogenes* and 99.999% reduction in total aerobic bacteria in raw milk, and 99.999% reduction in *E. coli*. Ultrasound application to insects generates various adverse and deteriorating changes in morphological, biochemical and functional conditions.

Ultrasounds can effectively eliminate copepods. Low frequency ultrasound, has, on the other hand, very limited effects on fish. Ultrasound can effectively kill copepods in less than 10 seconds. However, the same sound frequency that can effectively control copepods were found to have no impact on fish physiology or behavior.

Accordingly, only a few seconds of ultrasound exposure can successfully kill copepods without hurting fish and ultrasonic devices may be used for sea lice treatment and prevention in salmon farms particularly with eliminating free-swimming sea lice in farm water for sea lice outbreak prevention and for treating sea lice attached on fish. It is believed that the reflective nature of parts of fish bodies such as scales may serve to deflect ultrasound waves from having primary or residual effects on the fish, as opposed to the noxious aquatic organisms which are quickly and fatally affected by the ultrasound waves.

In order to facilitate and efficiently concentrate the effects of the ultrasound waves while protecting exterior environments, in one embodiment of the invention, the fish herding pipes and fish containing enclosures are interiorally lined with stainless steel and exteriorly covered with a soft, sound-deadening composite material. As a result, the generated ultrasound waves are continuously directed toward the fish and noxious aquatic organisms while the exterior environment is shielded from the ultrasound waves.

Currently, chemical treatment is applied after a sea lice outbreak. In accordance with embodiments of the invention, a first ultrasonic device, in embodiments herein, can terminate free-swimming sea lice to prevent an outbreak, and a second device can be used to treat sea lice on fish during and after an outbreak. Ultrasound technology is cost-effective, environmentally-sound, exhibits low fish mortality, and comprises a low maintenance alternative for sea lice treatment and prevention.

With reference to the drawings, in FIG. 1, a prior art mechanism for ultrasonic treatment of ballast water is shown with the ballast water or influent containing aquatic invaders or organisms from local sites in the ballast tank 10. The influent 1 is fed through a valve 11 through filter system 12 by means of water pump 20. The influent is then fed through controlled valve 13 and an ultrasonic treatment pipe 14 with operation of controller and power amplifier 15 and 16. The influent 1 is finally pumped into tank 17 as fully treated influent 1. The system is however not amenable for the flow of anything except water and microorganisms for providing resultant treated influent entirely clear of any organisms.

As shown in FIG. 2, a multiple section fish herding pipe section 100 is shown with peripherally positioned ultrasonic transducer pipes 101-104 with each containing an ultrasonic transducer 110. Lice carrying fish are herded through inlet 105, and treated at section 106 and exit outlet 107 for harvesting or movement into cages from outlet 107.

FIG. 3a schematically depicts an elongated large pipe 120 comprised of ten pipe sections 100 of FIG. 2 with each having separate transducer containing pipes 101-104 (power mechanisms for the respective transducers are not shown). FIG. 3b depicts an end view of the pipe 120 with aligned transducer containing pipes 101-104.

FIG. 4 is an aerial top view of a system collection 130 of a series of ten fish cages 140-149 with each having four internal ultrasound transducers 151-154. As shown, the total system is about 100 meters by 250 meters in width and length with each cage being about 50 by 50 meters. The interior circles 155 represent and indicate the position at which an attractant such as a white light is beamed for attraction of loose noxious parasitic organic organisms to gather at a focal point between the respective transducers 151-154 for maximum killing effectiveness of the organisms.

It is understood that the above description and drawings are exemplary of the invention and that changes in the method and structure used with the ultrasonic transducers is possible without departing from the scope of the invention as defined in the following claims.

What is claimed is:

1. A method for treatment of an enclosure containing water and salmon therein, to kill and remove parasitic, noxious aquatic sea lice having gas pockets therein, and freely dispersed in the water from affecting the salmon, comprising the steps of:
   i) feeding salmon into the enclosure having ultrasound transducers situated on the inner periphery thereof;
   ii) providing an attractant which attracts the parasitic, noxious aquatic sea lice thereto within the enclosure; and
   iii) applying ultrasound at a frequency at or above 20,000 Hz within the enclosure directly at the parasitic noxious aquatic sea lice for an application of at least two seconds for the acoustic cavitation of the gas pockets and killing of substantially all of the parasitic noxious aquatic sea lice within the water contained in the enclosure.

2. The method of claim 1, wherein the attractant is a white light.

3. An enclosure for salmon configured for use in the method of claim 1 comprising a plurality of peripherally placed ultrasound transducers and an attractant to attract noxious, parasitic aquatic sea lice between the ultrasound transducers.

4. A method for treatment of fish to effectively kill parasitic, noxious aquatic organisms having gas pockets therein, on the fish, comprising the steps of:
   1) providing a fish herding passage with a source of ultrasound waves positioned adjacent thereto with the source of ultrasound waves being configured to direct ultrasound waves into the herding passage:
   2) herding a specific type of fish at a normal herding rate of the type of fish through the fish herding passage, wherein the herded fish are externally covered with parasitic, noxious aquatic organisms thereon, with the parasitic, noxious, aquatic organisms having gas pockets therewithin;
   3) directing ultrasound waves from the source to strike at the herded fish while the fish are in the fish herding passage, with the ultrasound waves striking the fish having an ultrasonic frequency of at or above 20000 Hz, for at least two seconds;
   whereby the ultrasound waves cause the gas pockets of the parasitic, noxious aquatic organisms to expand and kill substantially all of them without harm to the fish.

5. The method of claim 4, wherein the fish herding passage is a pipe section of at least 20 feet in length and a diameter of at least one foot.

6. The method of claim 5, wherein spaced areas of the pipe section are circumferentially provided with spaced apart ultrasound transducers as the source of the ultrasound waves, which are directed toward an interior of the pipe through which the fish are herded.

7. The method of claim 6, wherein the circumferentially provided ultrasound transducers are four and wherein the pipe section has at least ten longitudinally spaced areas circumferentially each provided with the four ultrasound transducers.

8. The method of claim 4, wherein the fish herding passage is interiorally lined with stainless steel and exteriorly covered with a sound absorbing composite material.

9. The method of claim 4, wherein the parasitic, noxious aquatic organism is sea lice and the fish type is salmon, wherein the normal herding rate for the herding of the fish is the normal swimming speed of salmon.

10. A fish herding passage configured for use in the method of claim 4, comprising a tube passage of a size sufficient to herd the fish therethrough and with each area having multiple ultrasound transducers positioned around an exterior circumferential section thereon and the ultrasound transducers being directed to the interior of the tube passage.

11. The fish herding passage element of claim 10 wherein the interior of the tube passage is lined with stainless steel and the exterior of the tube passage is covered with a sound absorbing composite material.

* * * * *